United States Patent [19]

Kreutter

[11] 3,754,632
[45] Aug. 28, 1973

[54] PALLET STORAGE SYSTEM

[75] Inventor: Richard C. Kreutter, Battle Creek, Mich.

[73] Assignee: Clark Equipment Company, Buchanan, Mich.

[22] Filed: Nov. 9, 1970

[21] Appl. No.: 87,721

[52] U.S. Cl. .................................. 198/20, 198/180
[51] Int. Cl. ..................... B65g 47/00, B65g 15/00
[58] Field of Search...................... 198/20, 21, 163, 198/24, 180, 310, 34; 214/6 BA, 8.5 K, 16.4, 16.12

[56] References Cited
UNITED STATES PATENTS

| | | | |
|---|---|---|---|
| 3,239,054 | 3/1966 | Eliassen | 198/21 |
| 3,325,021 | 6/1967 | Burns | 214/6 BA |
| 3,340,992 | 9/1967 | Seragnoli | 214/6 BA |
| 3,522,942 | 8/1970 | Hepp | 198/20 R |
| 1,738,569 | 12/1929 | Fuller | 214/16.6 |
| 3,269,565 | 8/1966 | Kemp | 214/310 |

FOREIGN PATENTS OR APPLICATIONS

| | | | |
|---|---|---|---|
| 41,099 | 1/1962 | East Germany | 214/6 BA |
| 41,099 | 1/1962 | East Germany | 214/6 BA |

Primary Examiner—Richard E. Aegerter
Attorney—Kenneth C. Witt, John C. Wiessler, Robert H. Johnson and Lewis J. Lamm

[57] ABSTRACT

Pallet storage apparatus for storing pallets in a horizontal position vertically disposed with respect to each other utilizing two endless chains for supporting the edges of the pallets with means for lowering pallets on a conveyor system by the simultaneous actuation of the supporting chains and the pallet transfer mechanism.

1 Claim, 1 Drawing Figure

Patented Aug. 28, 1973
3,754,632
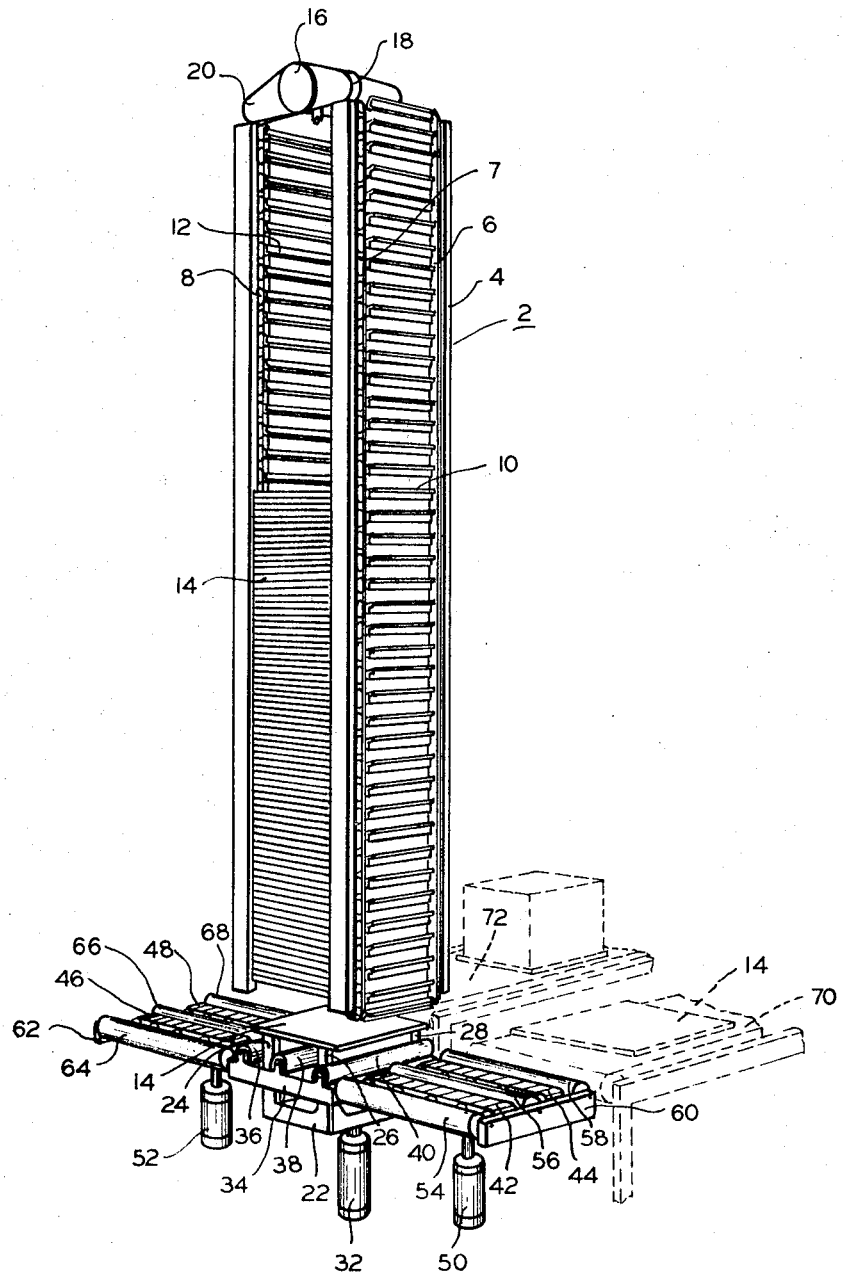
INVENTOR.
RICHARD C. KREUTTER
BY
ATTORNEY

3,754,632

PALLET STORAGE SYSTEM

BACKGROUND OF THE INVENTION

Previously, pallets have been stored horizontally in stacks and the individual pallets removed from the stacks manually and placed on conveyors to be transported to their place of use. They have also been brought to the conveyor or to the final place of use in containers or in small stacks. Also there are pallet handling systems that employ both a magazine and pallet transport means. An example of this type system is illustrated in U. S. Pat. No. 3,181,712 G. E. Von Gal, Jr. Systems such as this are expensive and complicated. These previous methods of handling pallets have frequently resulted in excessive use of floor space and have in many cases required manual handling of the pallets. Modern, high speed storage systems require that pallets be made available rapidly with low labor costs and with minimum use of floor space. This would ideally mean a simple, inexpensive automatic pallet storage apparatus in which the pallets are dispensed and carried to the place of use automatically.

SUMMARY OF THE INVENTION

The present invention relates to apparatus for the storage and dispensing of pallets automatically. It specifically relates to a means for storing them in a horizontal position, vertically disposed to each other. The pallets are supported by endless chains that discharge one pallet at a time onto a receiving and conveyor mechanism which will deposit the pallet at its place of use. This machine is also reversible so that pallets may be fed into the storage magazine from a conveyor. The machine will put empty pallets into storage, take empty pallets out of storage, or bypass the magazine and transport pallets directly to the point of final usage.

It is an object of this invention to provide an uncomplicated, economically feasible storage system which will operate automatically and require a minimum of floor space. Other objects will become apparent from the following description of a preferred embodiment, in which:

BRIEF DESCRIPTION OF THE DRAWING

Referring to the drawing, the magazine portion of the vertically extending pallet storage magazine is represented generally as 2 with a frame 4 and endless storage chains 6, 7 and 8 (the fourth chain is not shown). These chains have projecting ledge supports 10 and 12 thereon for supporting the pallets 14 at their edges. These chains are driven by an electric or air motor 16 through drive mechanisms 18 and 20, respectively, so as to operate in opposite directions. That is, the pallet supports 10 and 12 go down together or up together depending on whether it is desired to put pallets into the magazine or take them out. The pallets 14 are inserted into the magazine or received therefrom by means of a vertically movable pallet transfer means 22, having legs 24, 26, 28 and a fourth leg not shown which are simultaneously actuated vertically by an air cylinder 32. A stationary roller assembly support 34 for moving a pallet horizontally has powered rollers 36, 38 and 40 thereon capable of receiving the pallets 14 when they are lowered thereon by the actuation of the cylinder 32 lowering the vertically movable pallet transfer means 22. When the pallets 14 are resting on these rollers directly below the magazine section, a pair of powered dispensing belt conveyors 42 and 44 are located on one side under the edge of the pallet and powered belt conveyors 46 and 48 are located on the other side also under the edge of the pallet 14. The dispensing belts 42 and 44 may be actuated vertically by the cylinder 50 while 46 and 48 may be actuated vertically by the air cylinder 52. The frame 60 supports the powered rollers 54, 56 and 58 with the top edge of these rollers level with the top edges of the powered rollers 36, 38 and 40. Likewise, the frame 62 supports the rollers 64, 66 and 68 with their top edges on the same plane. The power of belt conveyors 70 and 72 used to transfer pallets to and from the storage apparatus is also located in the same plane as the rollers carried by the frames 34, 60 and 62. The conveyors 70 and 72 are powered by power means not shown.

OPERATION: LOADING PALLETS INTO MAGAZINE

Pallets are placed on the conveyor 70 at a remote position and are transported to a position over the powered rollers 54, 56 and 58. Their forward progress is stopped when they clear the edge of the belt 70. They are then in a position to be inserted under the magazine. At this point, the cylinder 50 is actuated to raise the conveyors 42 and 44. The pallets are then conveyed so as to place them on the powered rollers 36, 38 and 40. When the pallet is underneath the magazine, cylinder 50 is actuated to lower the conveyor and let the pallet rest on the above-mentioned rollers. The air cylinder 32 is then actuated and the finger supports 24, 26 and 28 carried by member 22 pick up the pallet and place it in a proximity of the lower edge of the magazine. At this time the motor 16 actuates the two chain conveyors 6 and 8 so that the supports 10 and 12 pick up the pallet and move it vertically off the supports 24, 26 and 28 (plus the fourth support not shown). This operation is repeated to place additional pallets in the magazine.

OPERATION: DISPENSE PALLETS FROM MAGAZINE

To dispense pallets from the magazine, the air cylinder 32 is actuated to place the pallet transfer table 22 in its uppermost position so that the supports 24, 26 and 28 are just underneath the pallet. The motor 16 is then energized to drive the chains 6 and 8 so that the supports 10 and 12 lower the pallet 14 onto the supports 24, 26 and 28. The air cylinder 32 is then actuated to lower the pallet onto the rollers 36, 38 and 40 in the lower position. The air cylinder 52 is then actuated to bring the belts 46 and 48 up under the edge of the pallet 14. These belts plus the rollers 36, 38 and 40 are then energized to pull the pallets out to a position over the rollers 64, 66 and 68. The air cylinder 52 is then actuated to lower the belts 46 and 48 so that the pallet now rests on the rollers 64, 66 and 68 and on the edge of the belt 72. The belt 72 then is operated to transport the pallet to the position of use.

OPERATION: TRANSFER OF PALLETS BYPASSING MAGAZINE

It is sometimes desirable to transport the pallet 14 from a conveyor 70 to a conveyor 72 without placing it in the magazine 2. If such transfer is desired, the operation of the equipment is as follows: The conveyor 70 brings pallet 14 to the rollers 54, 56 and 58 after which time the air cylinder 50 is actuated raising the belt conveyors 42 and 44 to pick up the pallet. The air cylinder 52 is simultaneously energized to raise the conveyors 46 and 48 and they are actuated to drive in the same direction as the conveyors 42 and 44. The pallet is then carried by the conveyors 42, onto the powered rollers 36, 38 and 40, and as the trailing edge of the pallet leaves the conveyors 42 and 44, the leading edge is picked up by the conveyors 46 and 48 and the pallet is then conveyed over the rollers 64, 66 and 68. When the pallet is in proper alignment to be picked up by the conveyor 72, the air cylinder 52 is then energized to lower conveyors 46 and 48 and thus place the pallet on 64, 66 and 68 after which time the rollers 36, 38 and 40 and conveyor 72 are then energized to convey the pallet away from the rollers. It may thus be seen that the present invention provides an automatic system by which the pallets may be placed in storage and removed therefrom or may be transferred from one conveyor to the other without going to the storage system.

It is obvious that the mechanism may be run in reverse to store pallets that are on conveyor 72 and also to discharge pallets from the storage magazine to the conveyor 70. By running the machine in the reverse direction it is also possible to convey pallets from the conveyor 72 to the conveyor 70.

While this specification contains a description of the invention and specific manners of using it, and sets forth the best mode contemplated for carrying out the invention, there are other variations, combinations and alterations that may be made without departing from the spirit of the invention and the scope of the appended claims.

I claim:

1. A pallet storage and dispensing system comprising;
   a vertically extending pallet storage magazine,
   power actuated, reversible elevating means in said storage means,
   multiple vertically spaced support means on the elevating means adapted to support multiple horizontally oriented pallets independently of each other,
   power actuated, horizontally movable transfer means for moving a pallet horizontally between one station and another station and being disposed below said magazine,
   vertically movable transfer means for moving a pallet vertically and having support means adjacent said horizontally movable transfer means adapted to engage said pallet and being disposed below said magazine,
   said support means on said elevating means being adapted at its lowermost position to release a pallet therefrom onto said vertically movable transfer means when the elevating means is moving downwardly and being adapted to pick up a pallet from the vertically movable transfer means when the elevating means is moving upwardly,
   actuating means connected with said vertically movable transfer means for raising it relative to said horizontally movable transfer means to lift a pallet therefrom and to lower it relative to said horizontally movable transfer means to deposit a pallet thereon,
   a receiving station including a pallet support means below said magazine and adapted to receive a pallet from the horizontally movable transfer means and from said vertically movable transfer means,
   a first transfer station including a pallet support means disposed adjacent one side of said receiving station and adapted to hold a pallet for pickup by said horizontally movable transfer means for transfer into the receiving station,
   a second transfer station including a pallet support means disposed adjacent the other side of said receiving station and adapted to hold a pallet transferred by said horizontally movable transfer means from said receiving station,
   and means for selectively actuating the horizontally movable transfer means at said first and second transfer station,
   whereby pallets may be transferred reversibly between said magazine and said horizontally movable transfer means through the intermediary of said vertically movable transfer means by reversing the direction of said elevating means.

* * * * *